Figure 1:
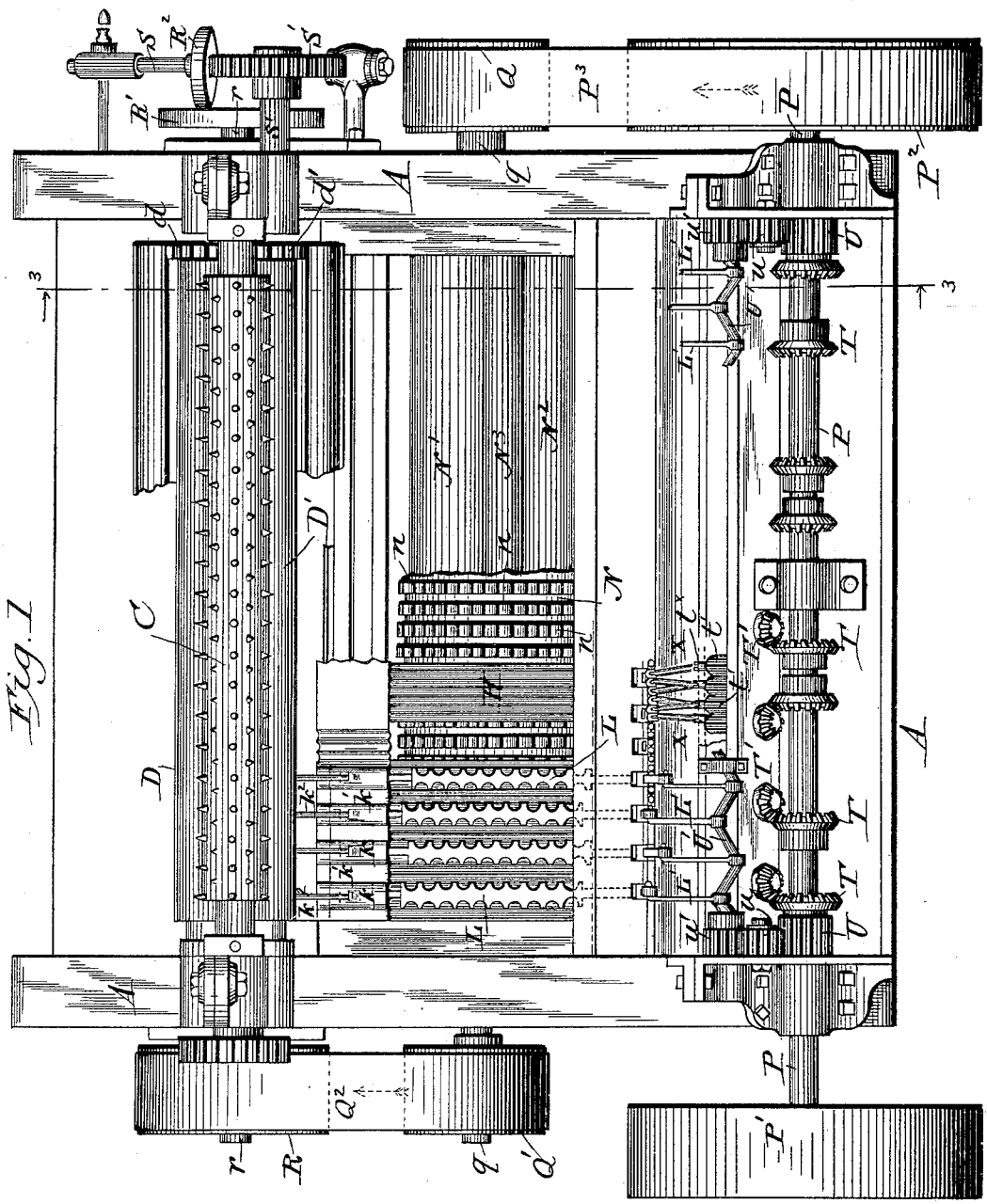

(No Model.) 4 Sheets—Sheet 1.

J. R. MONTAGUE.
ROLLER COTTON GIN.

No. 462,722. Patented Nov. 10, 1891.

WITNESSES:
Baltus DeLong.
B. Washington Miller

INVENTOR
JOHN R. MONTAGUE
BY
Baldwin Davidson & Wight
ATTORNEYS (No Model.)  4 Sheets—Sheet 2.

J. R. MONTAGUE.
ROLLER COTTON GIN.

No. 462,722.  Patented Nov. 10, 1891.

WITNESSES:
Baltus DeLong.
B. Washington Miller.

INVENTOR
JOHN R. MONTAGUE
BY
Baldwin Davidson & Wight
ATTORNEYS (No Model.) 4 Sheets—Sheet 3.
J. R. MONTAGUE.
ROLLER COTTON GIN.
No. 462,722. Patented Nov. 10, 1891.
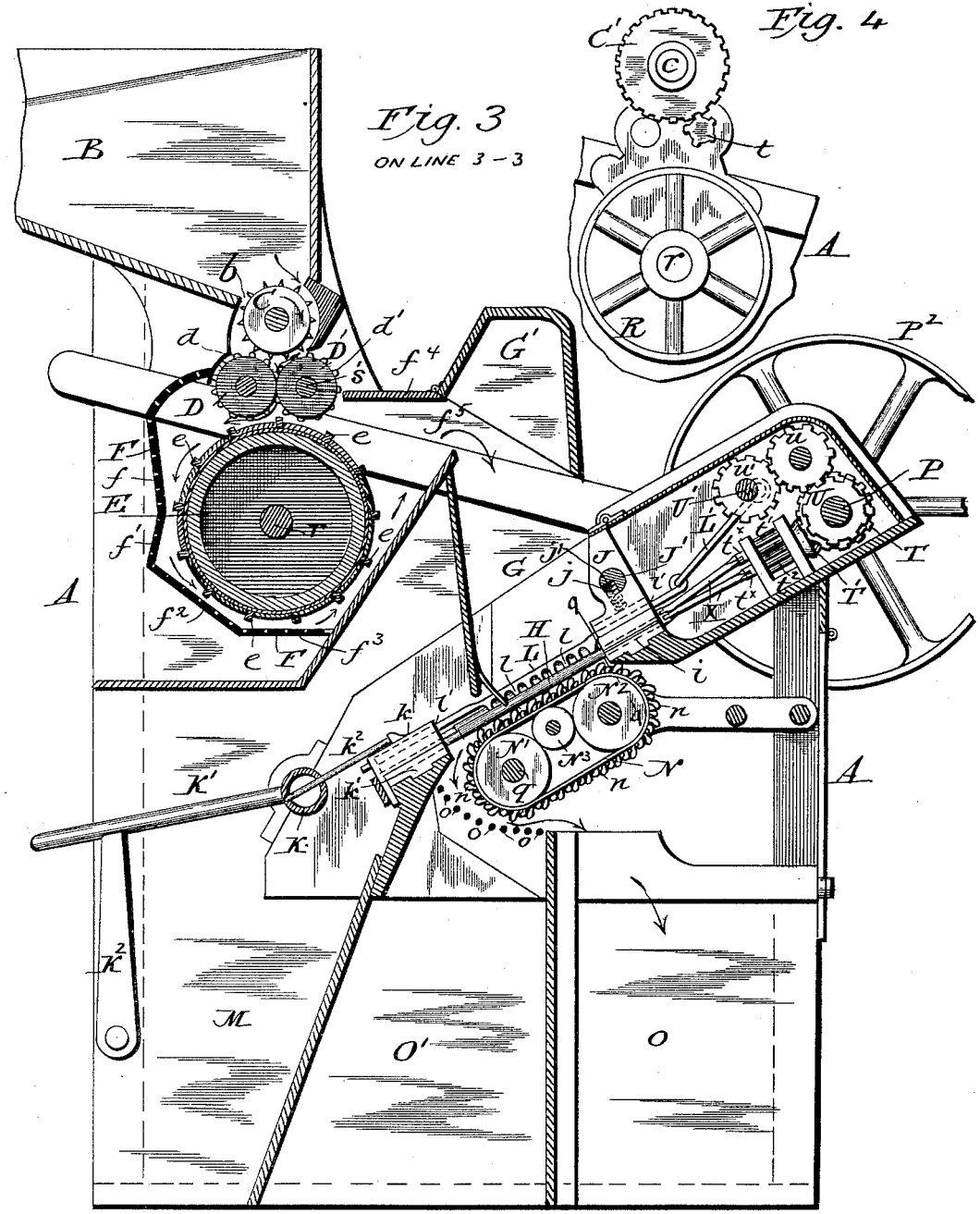
WITNESSES:
Baltus D. Long.
R. Washington Miller.
INVENTOR
JOHN R. MONTAGUE
BY
Baldwin Davidson & Wright
ATTORNEYS (No Model.) 4 Sheets—Sheet 4.
J. R. MONTAGUE.
ROLLER COTTON GIN.
No. 462,722. Patented Nov. 10, 1891.
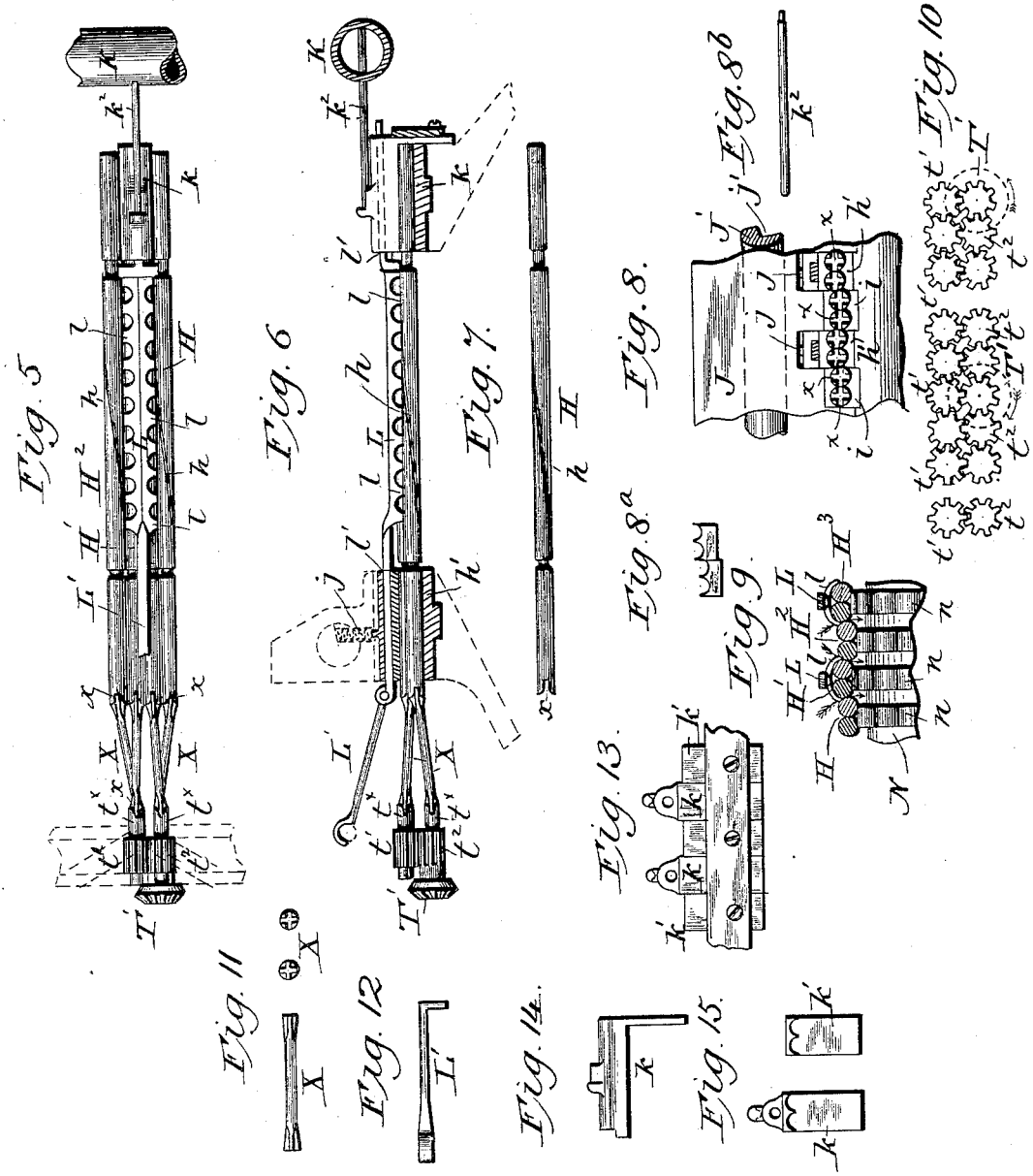
WITNESSES:
INVENTOR
JOHN R. MONTAGUE
BY
ATTORNEYS

UNITED STATES PATENT OFFICE.

JOHN R. MONTAGUE, OF SYRACUSE, NEW YORK, ASSIGNOR TO THE MONTAGUE ROLLER COTTON GIN COMPANY, OF SAME PLACE.

ROLLER COTTON-GIN.

SPECIFICATION forming part of Letters Patent No. 462,722, dated November 10, 1891.

Application filed November 21, 1890. Serial No. 372,218. (No model.)

*To all whom it may concern:*

Be it known that I, JOHN R. MONTAGUE, a citizen of the United States, residing at Syracuse, in the county of Onondaga and State of New York, have invented certain new and useful Improvements in Roller Cotton-Gins, of which the following is a specification.

My invention relates to roller cotton-gins. Its objects are to open or spread out the bolls, to remove impurities therefrom, to deliver the cotton to the ginning-rolls in good condition for that operation, effectually to separate the lint-cotton from the seed, to keep the rolls clear, and to remove all impurities practicable from the lint during the process. These ends I attain by the novel constructions, organizations, and combinations of instrumentalities hereinafter specified in the claims.

In order to carry out my invention I provide a hopper for the seed-cotton, having an opening near its bottom, in which slowly revolves a feed-roll, which opens out the bolls and feeds the seed-cotton to more rapidly-revolving drawing or retaining rolls, which in turn deliver it to a still more rapidly-revolving beater-roll having a polygonal reticulated casing or screen. The seed-cotton in passing around the beater is caused repeatedly to rebound against the beater and screen, thus insuring its being drawn out in good shape, while impurities escape through the reticulations of the screen. The seed-cotton is discharged from the beater-casing into a trunk provided with an expansion, enlargement, or hood, the effect of which is to diminish the force of the blast created by the beater and to allow the seed-cotton to fall evenly upon longitudinally-arranged inclined ginning-rolls of small diameter, traversed lengthwise by ginning-teeth, which separate the seed and discharge them longitudinally over the roller and its lower bearings into a suitable receptacle, while the lint-cotton is drawn through the rolls and discharged upon a traversing-clearer belt, whence they pass over a screen, through which impurities may fall, and are finally discharged into a suitable receptacle.

Figure 2:
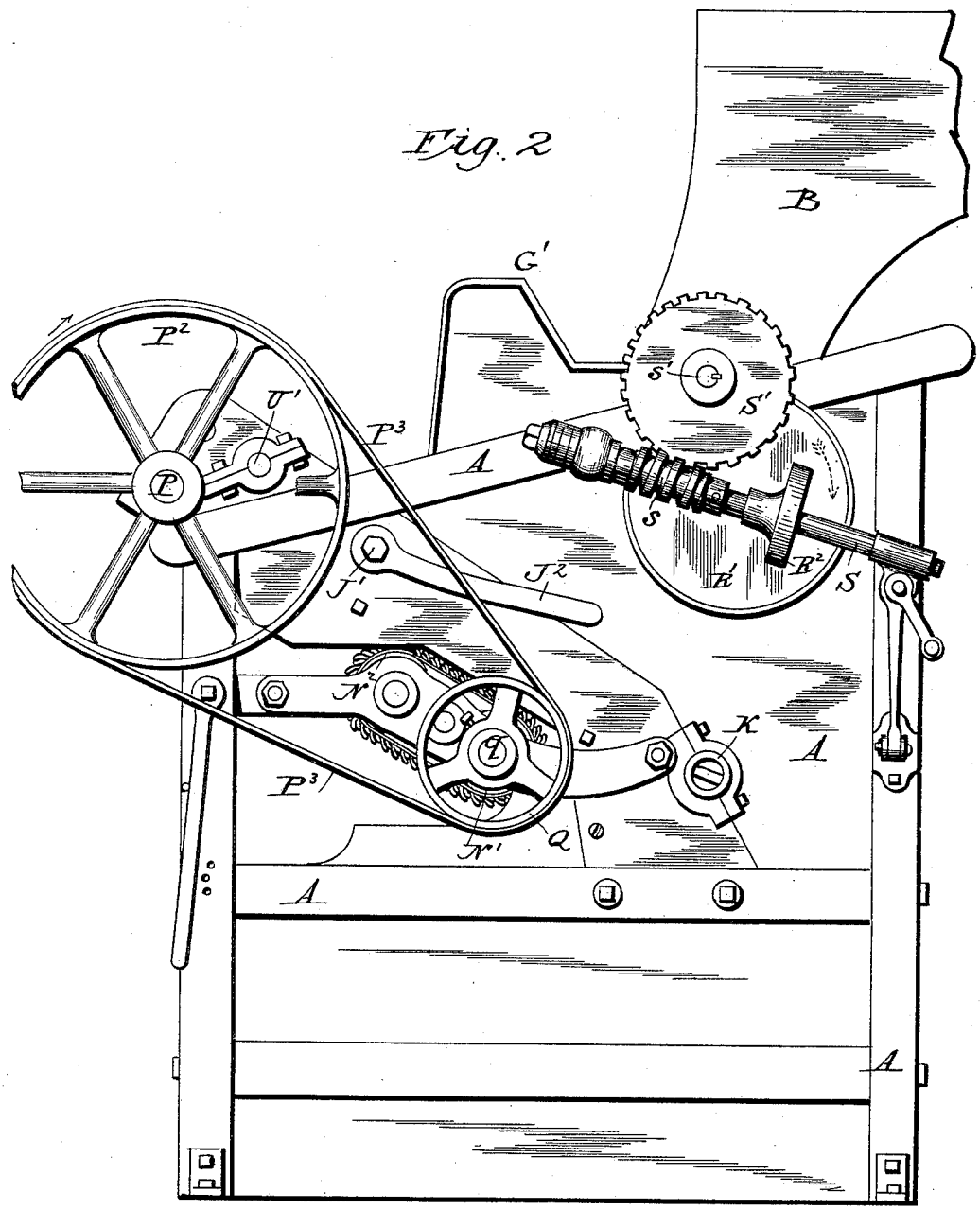

In the accompanying drawings, which show so much only of my improved cotton-gin as is necessary to illustrate the subject-matter claimed, Figure 1 is a plan with parts broken away. Fig. 2 is an elevation of the left side of the machine; Fig. 3, a vertical longitudinal section on the line 3 3 of Fig. 1, looking to the left, as indicated by short darts, or in the opposite direction to that shown in Fig. 2. Fig. 4 is an elevation of part of the gearing on the right-hand side of the machine. Fig. 5 is a plan showing the detail of the ginning-rolls, ginning-teeth, and gearing; Fig. 6, a side elevation thereof; Fig. 7, one of these rolls detached; Fig. 8, an elevation, partly in section, of the upper end of the ginning-rolls, &c.; Fig. $8^a$, a vertical cross-section through the bearings of these rolls; Fig. $8^b$, a rod-spring detached; Fig. 9, a vertical cross-section through the ginning-rolls on the line 9 9 of Fig. 3; Fig. 10, an end view of the ginning-roll gears; Fig. 11, detail views of the upper driving-shafts of the gin-rolls; Fig. 12, a detail view of the pitman which drives the ginning-teeth; Fig. 13, a detail end view of the lower ginning-roll bearings; Fig. 14, an edge view thereof, and Fig. 15 inside end views of the bearings and their interposed guide-blocks. Figs. 5 to 15, both inclusive, are on an enlarged scale.

The feed end of the machine I term the "front," the discharge end the "rear." That portion on the right of a person in front of and facing the front of the machine I term the "right side," the opposite side the "left." Arrows indicate the direction of movement. Unless otherwise indicated, the parts are of well-known construction.

The mechanism is shown as mounted in a frame A. The seed-cotton is placed in a hopper B, having a discharge-opening $b$ in its lower rear end, in which a toothed or spiked feed-roll C slowly revolves, the rear side of the roller moving downward, as indicated by the arrow in Fig. 3. Two drawing or retaining rolls D D', preferably of rubber or equivalent yielding material, are arranged beneath and parallel with the feed-roll C and revolve at a higher speed. The feed-roll C draws, opens, or spreads out the bolls and delivers them to the retaining-rolls D D' in this condition, instead of in lumps or masses, as would otherwise be the case, while the retaining-rolls, which revolve toward each other, pinch or hold the cotton and feed it down between them into contact with a rapidly-revolving beater-roll E of larger diameter and of wood or other hard material, with metal ribs $e$ thereon, which snatch the cotton from the retaining-rolls and beat out dust, sand, trash, and other impurities and thoroughly open the bolls. The beater-roll revolves in a stationary polygonal perforated or reticulated casing or screen F, through which dust and other fine impurities escape. The casing is shown as reticulated on its front side, which also has several bends $f f' f^2 f^3$ in it, which form pockets or recesses, into which the seed-cotton is thrown by the centrifugal action of the beater, and thus caused alternately to strike the beater and casing, so as thoroughly to remove impurities and facilitate the opening of the bolls. The rear side of the casing is solid and extends upward and backward, and together with the cover $f^4$ forms a channel $f^5$, through which the seed-cotton is discharged from the beater into a trunk G, provided with a hood or expanded portion C' at its upper end. This hood performs the important function of a dead-air or eddy chamber, into which both the seed and cotton are thrown and then permitted to drop through the open bottom of the trunk in an evenly-diffused mass, instead of being discharged in a concentrated mass, as would be the case were the trunk of uniformly small diameter, as I have demonstrated in practice.

The trunk G terminates over a series of longitudinal ginning-rolls H H' $H^2$ $H^3$, &c., inclined from rear to front at an angle of about twenty degrees to the horizon and arranged beneath and transversely to the feed, drawing, and beater rolls. These ginning-rolls are arranged in pairs, those of each pair lying close together in the same horizontal plane. The alternate pairs of rolls also lie in different horizontal planes, the purpose of which will be explained hereinafter. Each higher pair of ginning-rolls H' $H^3$, &c., rests at its upper end in a bearing-block $h'$, capable of vertical movement in slots in a guide-block J, and normally held down in proper relation to the fixed pairs of rolls H $H^2$, &c., by spiral springs $j$, abutting against shoulders $j'$ in a roller J', capable of being turned axially in its bearings in the guide-block J by means of a lever $J^2$, Fig. 2. This device regulates the pressure of the rolls and yet permits them to yield to accommodate irregularities in the lint-cotton passing between them. The lower ends of the yielding rolls H' $H^3$ are in like manner mounted in bearing-blocks $k$, capable of sliding vertically between fixed blocks $k'$, and controlled by rod-springs $k^2$ on a rock-shaft K, controlled by a lever K' and pivoted stop $K^2$. The rolls are thus free to rise at either end. The central or ginning portion of each roll is provided with a spiral groove $h$, through which small hard particles, which otherwise might impede the proper action of the rolls, can escape. The ginning-rolls are made of small diameter relatively to their length—say from one-half to five-eighths of an inch in diameter and about eight inches between their bearings. A former patent of mine shows such small rolls arranged crosswise of the machine; but by arranging them lengthwise, as herein shown, I am enabled to use any desired width of ginning-surface without increasing the length of the rolls, besides securing other advantages. The ginning-rolls are so geared as to revolve in alternately-opposite directions, and so that the adjacent faces of contiguous sets of rolls revolve in the same direction—that is, downward—so as to draw the lint down between them, the vertically-movable rolls yielding to accommodate inequalities, as hereinbefore stated. Ginning-teeth $l$ are arranged to vibrate longitudinally over, close to, and parallel with the ginning-rolls. They are shown as mounted on bars L, sliding endwise in guides $l'$ in the vertically-movable bearing-blocks $h'$ $k$, thus always maintaining their relation to the yielding ginning-rolls, around which they curve with their points between the fixed and adjustable rolls, so that they rise out of the way of inequalities with the yielding rolls. The lint-cotton is drawn between the ginning-rolls, while the seed are moved partly by the ginning-teeth and partly by gravity endwise over the surface of the fixed rolls, over the lower end of which they fall into a suitable receptacle M. The lint passes down between the ginning-rolls and is deposited on a traversing clearer, shown as made in the form of an endless belt N, traversing rollers N' $N^2$, and held close to the under side of the ginning-rolls by a small roller $N^3$. The belt carries parallel longitudinal rows $n$ of loops or tufts of rubber or equivalent material, which sweep the rolls clear of clogging matter. The lint is deposited by the ginning-rolls in the space between the rows of loops (see Fig. 9) and carried down over the lower end of the belt, where it falls upon a grating or screen of horizontal parallel rods $o$, over which it passes to a receptacle O, any remaining detachable impurities falling through the grating into a separate compartment O'.

A driving-shaft P at the back of the machine carries on its right-hand end a pulley P', driven from the prime mover. A pulley $P^2$ on the opposite end of this shaft carries a band $P^3$, encircling a smaller pulley Q on a shaft $q$, which extends through the frame and carries on its opposite end a pulley Q', encircled by a band $Q^2$, driving a pulley R on a third shaft $r$, likewise extending through the frame and carrying on its opposite end a friction-disk R', against which a friction-pulley $R^2$ on a shaft S bears. This shaft inclines upward and backward and carries a worm $s$, which gears with a spur-wheel S' on a shaft $s'$, which is that of the rear detaining-roller D', which drives its companion D through the gears $d$ $d'$. A spur-pinion $t$, Fig. 4, on the shaft $s'$ drives a spur-gear C' on shaft $c$ of the feed-roll C, and as the gear C' is larger than that $t$, the feed-roll of course revolves more slowly than the retaining-rolls, which thus draw away the seed-cotton from the feed-roll and present its accumulation between them. The beater-roll E is carried and driven by the shaft $r$, as above described, which shaft, under the organization shown, always revolves at a uniform speed, while that of the feed-roll C and detaining-rolls may be varied by varying the distance of the friction-pulley $R^2$ from the axis of the friction-disk R'. The ginning-rolls are shown as driven by a series of bevel-gears T on the driving-shaft P, meshing with corresponding gears T' on short shafts $t^\times$, carrying spur-pinions $t^2$, meshing with similar pinions $t'$, Figs. 5 and 6. The diameter of these gears is preferably a little less than twice that of the ginning-rolls, so as to permit of the gears $t'$ $t^2$ being arranged in groups driven from gears arranged at intervals along the driving-shaft, thereby equalizing the strain thereon. The ends of the shafts $t^\times$ and of the ginning-rolls contain recesses $x$, into which the ends of correspondingly-shaped shafts X are inserted, thus allowing the ginning-rolls to yield in their bearings, as above explained, without cramping their driving-gears. Spur-gears U on the driving-shaft P, through the gears $u$, drive pinions $u'$ on a cranked shaft U', connected by pitmen L' with the ginning-teeth bars L. The clearer-belt N is driven by means of its roller N', carried by the shaft $q$.

The operation of the machine will readily be comprehended from the foregoing description.

From the foregoing description it will be seen that some of the distinguishing peculiarities of my improved machine are that the seed-cotton is drawn by a slowly-revolving roll from the hopper and fed downward between two equal-sized drawing-rolls revolving in opposite directions at uniform speeds, but more rapidly than the feed-roller, which drawing-rolls deliver the seed-cotton upon a solid longitudinally-ribbed beater-roll of still higher surface velocity, the centrifugal action of which throws the seed-cotton against a fixed polygonal perforated screen, driving the dust therethrough, but discharging the seed and lint upward into a hood or dead-air space, from which it falls through a trough upon a series of inclined ginning-rolls of small diameter traversed lengthwise by ginning-teeth which separate the seed from the lint, allowing them to slide lengthwise over the rollers, while the lint passes down between them upon a clearer-belt traversing underneath and parallel with the ginning-rolls and discharging the lint through a screen into a suitable receptacle.

Having thus fully described the construction, organization, and operation of my improved roller cotton-gin, what I claim therein as new and as of my own invention is—

1. The combination, substantially as hereinbefore set forth, of a hopper, a toothed feed-roll revolving slowly in an opening therein, yielding-surfaced drawing-rolls of uniform diameter revolving in opposite directions beneath the axis of the feed-roll, between which drawing-rolls the seed-cotton is fed downward, a solid beater-roll directly beneath the drawing-rolls, the reticulated casing inclosing the beater-roll, and mechanism for imparting greater surface velocity to the drawing-rolls than to the feed-roll and to the beater-roll than to the drawing-rolls.

2. The combination, substantially as hereinbefore set forth, of a longitudinally-ribbed solid-surfaced beater-roll, its actuating mechanism, and its polygonal reticulated inclosing casing or screen, through the stationary walls of which the dust is thrown by the centrifugal action of the beater-roll, which finally discharges the seed and lint through an opening in this casing.

3. The combination, substantially as hereinbefore set forth, of a longitudinally-ribbed solid-surfaced beater-roll, its actuating mechanism, its stationary polygonal reticulated casing or screen, through the front portion of which the dust is thrown by the centrifugal action of the beater-roll, a trunk connected with the rear side of the casing, and an intermediate expansion or hood of the upper part of the trunk into which the seed-cotton is thrown by the beater.

4. The combination, substantially as hereinbefore set forth, of a hopper, a toothed feed-roll revolving in an opening in its bottom, drawing-rolls revolving beneath the feed-roll, a longitudinally-ribbed solid-surfaced beater-roll directly beneath the drawing-rolls, a polygonal reticulated screen inclosing the feed and beater rolls, a trunk connected therewith, an intermediate expansion or hood between the casing and trunk into which the seed-cotton is directly thrown by the beater, and mechanism which drives the feed-roll, the drawing-rolls, and beater-roll, each successively faster than the other, for the purposes described.

5. The combination, substantially as hereinbefore set forth, of a hopper, a feed-roller revolving in an opening therein, drawing-rolls revolving beneath the feed-roll, a longitudinally-ribbed solid-surfaced beater-roll directly beneath the drawing-rolls, a polygonal reticulated screen inclosing the feed and beater rolls, a trunk connected therewith, an intermediate expansion or hood, and ginning-rolls arranged transversely to the other rolls, whereby the seed-cotton is fed lengthwise over them.

6. The combination, substantially as hereinbefore set forth, of a hopper, a feed-roll revolving in an opening therein, drawing-rolls beneath the feed-roll, a beater-roll beneath the drawing-rolls, and ginning-rolls arranged transversely and at an angle relatively thereto to cause the seed-cotton to be discharged lengthwise over the lower bearing of the feed-roll.

7. The combination, substantially as hereinbefore set forth, of a beater-roll, ginning-rolls arranged transversely and at an angle relatively thereto, interposed ginning-teeth traversing the ginning-rolls lengthwise, and mechanism for actuating these parts, the organization being such that the lint-cotton passes down between the rolls, while the seed slides endwise over the lower bearing of the feed-roll.

8. The combination, substantially as hereinbefore set forth, of a beater-roll, its casing, a trunk connected therewith, ginning-rolls arranged transversely to the beater-roll, interposed ginning-teeth traversing the ginning-rolls lengthwise, and mechanism for actuating their moving parts.

9. The combination, substantially as hereinbefore set forth, of a hopper, a feed-roll revolving in an opening therein, drawing-rolls beneath the feed-roll, a beater beneath the drawing-rolls, its casing, a trunk connected therewith, its hood, ginning-rolls revolving on inclined axes, ginning-teeth traversing lengthwise of the rolls, and mechanism for actuating the moving parts.

10. The combination, substantially as hereinbefore set forth, of ginning-rolls revolving on inclined axes so as to cause the seed-cotton to slide longitudinally endwise over them, a clearer traversing these rolls longitudinally, and mechanism actuating the rolls and clearer.

11. The combination, substantially as hereinbefore set forth, of ginning-rolls revolving on inclined axes ginning-teeth reciprocating parallel with the rolls, clearers also traversing parallel therewith, and mechanism actuating all these parts.

12. The combination, substantially as hereinbefore set forth, of a revolving beater, its casing, a trunk connected therewith, ginning-rolls arranged across the mouth of the trunk on inclined axes transverse to the axis of the beater-roll, ginning-teeth reciprocating lengthwise of the rolls, clearers traversing them longitudinally, and mechanism actuating the moving parts.

13. The combination, substantially as hereinbefore set forth, of a hopper, a feed-roll revolving in an opening therein, drawing-rolls beneath the feed-roll, a beater-roll beneath the drawing-rolls, its casing, a trunk connected therewith, ginning-rolls on inclined axes crossing the trunk, ginning-teeth reciprocating lengthwise over the rolls, clearers traversing the rolls longitudinally, and mechanism actuating the moving parts.

14. The hereinbefore-described cotton-gin clearer, consisting of an endless longitudinally-traversing flexible band carrying longitudinal parallel loops or tufts to brush away the lint-cotton, as described.

15. The combination, substantially as hereinbefore set forth, of parallel ginning-rolls in substantially the same plane, a clearer traversing them longitudinally, and mechanism actuating both rolls and clearer.

16. The combination, substantially as hereinbefore set forth, of ginning-rolls, an endless-belt clearer traversing them longitudinally, its carrying-rollers, an interposed bearing-roller, and mechanism actuating the rolls and carrier.

17. The combination, substantially as hereinbefore set forth, of ginning-rolls, clearers traversing them longitudinally, a grating on which the clearer drops the lint-cotton, and mechanism actuating the rolls and carriers.

18. The combination, substantially as hereinbefore set forth, of ginning-rolls arranged in sets in parallel planes, ginning-teeth embracing and movable endwise over each alternate set of rolls, clearers parallel with these sets and also movable longitudinally relatively thereto, and mechanism actuating all these.

19. The combination, substantially as hereinbefore set forth, of inclined ginning-rolls, endwise-moving ginning-teeth, their lower bearings over which the seed are discharged, and mechanism actuating the rolls and teeth.

20. The combination, substantially as hereinbefore set forth, of ginning-rolls arranged in sets, yielding bearings for each alternate set of rolls, clearing-teeth mounted and movable endwise in said bearings, and mechanism actuating the rolls and teeth.

21. The combination, substantially as hereinbefore set forth, of a series of ginning-rolls arranged in substantially the same plane, their yielding bearings, springs bearing thereon, and mechanism simultaneously regulating the pressure on one end of all the yielding rolls.

22. The combination, substantially as hereinbefore set forth, of ginning-rolls arranged in sets in parallel planes, yielding bearings for alternate sets thereof, their driving-gears, their intermediate driving-shafts, and the slip-couplings connecting the gears and rolls to compensate their yielding movement.

23. The combination, substantially as hereinbefore set forth, of inclined ginning-rolls, longitudinal spiral grooves of slight twist therein, ginning-teeth movable endwise over the rolls, and mechanism actuating the rolls.

24. The combination, substantially as hereinbefore set forth, of a series of ginning-rolls of small diameter arranged parallel and close to each other in substantially the same inclined plane and provided with spiral grooves of slight twist therein, the organization being such that the seed are discharged over the lower end of the rolls, while the lint passes down between them.

25. The combination, substantially as hereinbefore set forth, of a series of parallel ginning-rolls of small diameter arranged in substantially the same inclined plane, yielding bearings for alternate sets of the rolls at each end, ginning-teeth movable endwise in these bearings in contact with the upper surface of these rolls, clearers traversing the opposite sides of these rolls longitudinally, and mechanism actuating the rolls, teeth, and clearers, for the purposes described.

In testimony whereof I have hereunto subscribed my name.

JOHN R. MONTAGUE.

Witnesses:
  LLOYD B. WIGHT,
  BALTUS DeLONG.